United States Patent [19]
Feng et al.

[11] Patent Number: 5,409,422
[45] Date of Patent: Apr. 25, 1995

[54] TWO SPROCKET TOOTH TRIMMING METHODS AND THE STRUCTURE THEREOF FOR THE MULTI-STAGE SPROCKET ASSEMBLY IN A BICYCLE

[75] Inventors: Chan-Hua Feng, Hsinchu; Ching-Huan Tseng, Hsinchu Hsien; Chwan-Cherng Wang, Taipei; Chung-Biau Tsay, Hsinchu; Chang-Dau Yan, Taipei, all of Taiwan, Prov. of China

[73] Assignee: Industrial Technology Research Institute, Hsinchu, Taiwan, Prov. of China

[21] Appl. No.: 219,520

[22] Filed: Mar. 28, 1994

[51] Int. Cl.$^6$ .............................. F16H 55/30
[52] U.S. Cl. ........................ 474/156; 474/160
[58] Field of Search ............... 474/152, 153, 155, 156, 474/160, 161, 162, 163

[56] References Cited

U.S. PATENT DOCUMENTS

| | | | |
|---|---|---|---|
| 5,162,022 | 11/1992 | Kobayashi | 474/160 X |
| 5,188,569 | 2/1993 | Kobayashi | 474/160 |
| 5,192,250 | 3/1993 | Kobayashi | 474/160 X |

*Primary Examiner*—Michael Powell Buiz
*Attorney, Agent, or Firm*—W. Wayne Liauh

[57] ABSTRACT

A multiple sprocket assembly for use in a bicycle comprising: (1) at least a large sprocket wheel and a small sprocket wheel, each of the large and small sprocket wheels having a plurality of teeth on an outer edge thereof, and the large sprocket wheel having more teeth than the small sprocket wheel; (2) each of the sprocket wheels being adapted to engage with a chain guided by a derailleur; the chain comprising a plurality of rollers connected in series by link plates. The multiple sprocket assembly is characterized in that the small sprocket wheel has at least two consecutive teeth, each with a portion of its side surface trimmed off, and the large sprocket wheel has at least three consecutive teeth each also with a portion of its side surface trimmed off, so as to avoid interference between the link plates and the large sprocket when the chain is being shifted from the small sprocket to the large sprocket. In a preferred embodiment, at least two of the trimmed portions on the small sprocket are formed on the first distal side surface, and the trimmed portions on the large sprocket contain at least two trimmed portions on the second distal side surface and at least one trimmed portion on the second proximal side surface. The side surfaces of the teeth of the small sprocket are trimmed in such a manner such that the escape roller will not be immediately lifted up, but will be pushed laterally as a result of the trimmed portions of the small sprocket. The side surfaces of the teeth of the large sprocket are trimmed in such a manner such that one of the surfaces contains an axially extending portion, which serves as a fulcrum for the engage roller to be pivotally engaged with the large sprocket.

4 Claims, 5 Drawing Sheets

TWO SPROCKET TOOTH TRIMMING METHODS AND THE STRUCTURE THEREOF FOR THE MULTI-STAGE SPROCKET ASSEMBLY IN A BICYCLE

BACKGROUND OF THE INVENTION

The conventional design of teeth shape for shifting a chain from a smaller sprocket wheel to a larger sprocket wheel of the multi-stage sprocket assembly is based on a supposition that the linear distance between the center of the escape roller and that of the engaging roller is an integer multiple of the chain pitch during gear shifting process, i.e., the chain portion between the aforesaid two rollers is aligned straight, such as U.S. Pat. Nos. 4,889,521 and 4,268,259. The tooth shapes of the sprocket wheels are trimmed in accordance with the aforesaid supposition.

During the gear shifting process from a smaller sprocket wheel to a larger sprocket wheel, the chain will first contact with the side surface of the larger sprocket wheel before fully engagement occurred. Due to the aforesaid contact, there will be an articular angle induced between the first contact link and the roller that actually first engage with the tooth of the larger sprocket. That means, the chain between the escape roller and the engaging roller is not aligned straight, therefore, the linear distance between the roller centers would not be an integer multiple of the chain pitch. Consequently, the supposition of the engaging operation in the conventional shifting design is not consistent with the actual operation.

SUMMARY OF THE INVENTION

This invention relates to two sprocket tooth trimming methods and the structure thereof for the multi-stage freewheel in a bicycle; the multi-stage freewheel comprises at least a smaller sprocket wheel and a larger sprocket wheel. When the chain is shifted by a rear derailleur from the smaller sprocket wheel to the larger sprocket wheel, the last roller which engage with the smaller sprocket wheel is referred as the escape roller; the roller at a distance of proper pitches downward from the escape roller which will first engage with the larger sprocket teeth is referred as the engaging roller; the first roller upward and the first link plate downward from the engaging roller is referred as the pivot roller and the engaging link plate, respectively. The object of the present invention is to provide a new design procedure and the structure thereof to design tooth shapes of the shifting portions so as to improve the shifting performance and minimize the trimming extents on the teeth of a multi-speed freewheel.

Two trimming methods are presented to maximize the number of the shifting portion, improve the efficiency of the gear shifting, and minimize the extents of trimming; in the first trimming method, the positions of the escaping and engaging rollers have to be selected according to the teeth number of the smaller sprocket wheel and the teeth number of the larger sprocket, and then to adjust the relative phase angle between the larger sprocket wheel and the smaller sprocket wheel so as to have the pivot roller contact with the side surface of the larger sprocket wheel while the chain is in a balanced tension status; please notice that the position of the pivot roller is not aligned to the straight line drawn from the escape roller to the engaging roller due to the nature of the engaging motion and the requirement of trimming extents minimization; then the tooth shapes of the first kind of shifting portion can be trimmed accordingly; in the second trimming method, the positions of the escaping and engaging rollers and the relative phase angle between the smaller sprocket wheel and the larger sprocket wheel are predetermined and then to adjust the position of the pivot roller so as to have the chain is in a balanced tension status; if the position of a pivot roller is within the predetermined range that will assure the rollers of the chain will not override on the tip on the larger sprocket, the tooth shapes in the second kind of shifting portion can be trimmed accordingly. After the teeth shapes are trimmed according to the present invention, the pivot roller would provide a pivot function so as to have the chain portion downward from the pivot roller to rotate with respect to the pivot roller instead of the escape roller; then, the engaging roller would engaged with the engaging tooth of the larger sprocket wheel to fulfil the shifting operation.

DETAILED DESCRIPTION

Figure 3:
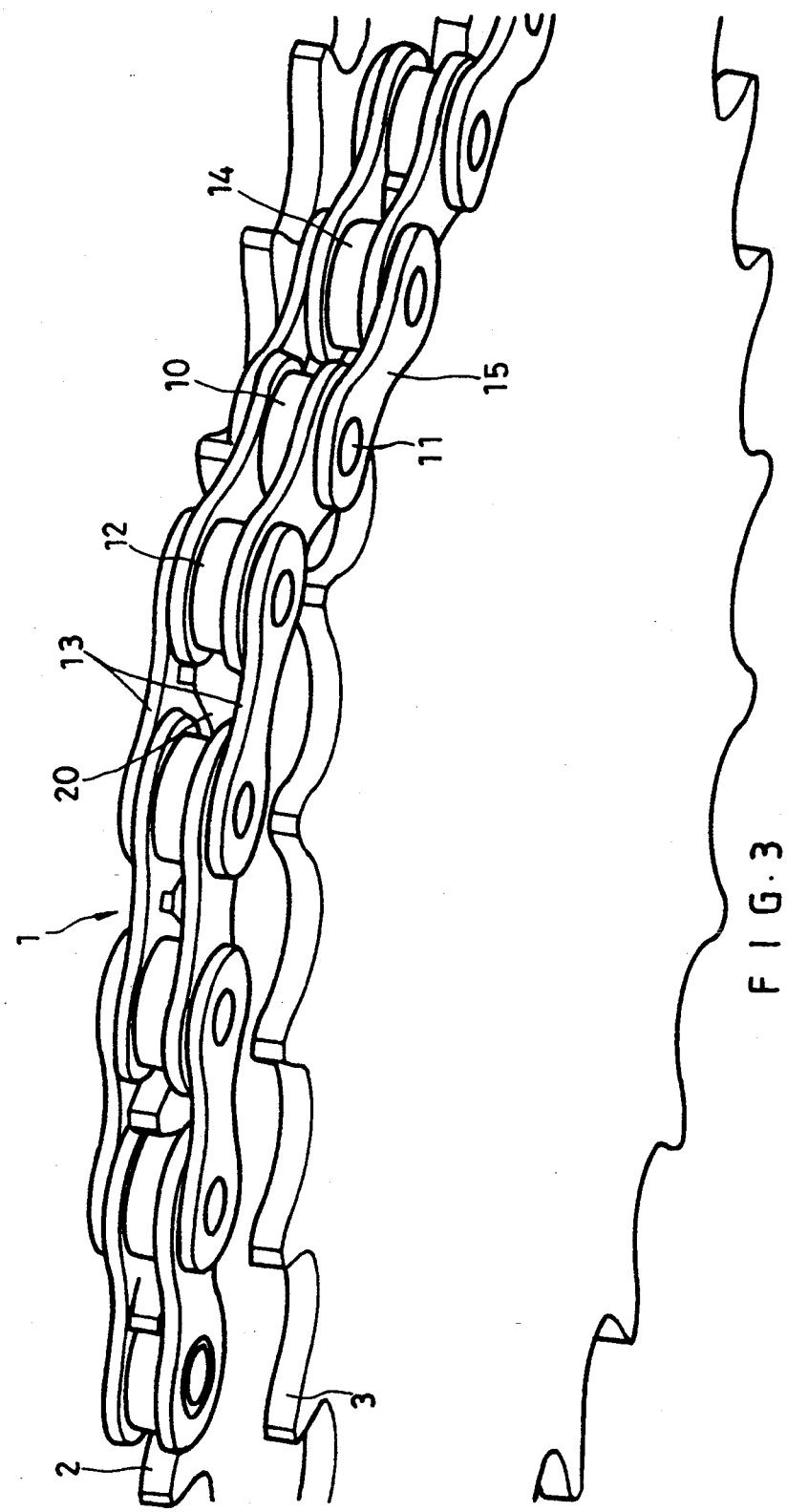
FIG. 3 is a perspective view of the present invention, showing a chain already engaged with a larger sprocket wheel.

In order to improve the efficiency of the gear shifting process for a multi-speed bicycle, the inventor has developed a new method for adjusting the relative phase angle between the larger and the smaller sprocket wheels by introducing the use of the pivot roller. As shown in FIG. 3, when a chain 1 is shifted from the smaller sprocket wheel 3 to the larger sprocket wheel 2, the guide pulley (not shown) of the rear derailleur is used to guide the chain to move laterally from the smaller sprocket wheel 3 to the larger sprocket wheel 2; the first roller and the link plate that fully engaged with the tooth of the larger sprocket tooth are referred as the engaging roller 12 and the engaging link plate 13, respectively; the first roller upward from the engaging roller is referred as the pivot roller 10. During the shifting process, either the pin 11 of pivot roller or the corresponding outer link plate 15 would first contact with the side surface of the larger sprocket wheel 2; the pin 11 of the pivot roller is functioning as a pivot so as to form an articular angle $\alpha$ between the upward link and the downward link thereof; therefore, the engaging roller 12 is engaged with the larger sprocket 2 by rotating with respect to the pivot roller 10; the aforesaid articular angle $\alpha$ at the pivot roller generates two sections of straight lines in the chain portion between the engaging roller and the escape roller. The extents of trimming on the tooth of the sprocket can be minimized by sharing the trimming portions to both the smaller and larger sprocket wheels 2, 3 and properly choosing the position of the pivot roller 10 while remain the smooth gear shifting performance. The position of the pivot roller 10 is calculated by a optimization computer software that is combined with a solid modeling CAD system.

Figure 5:
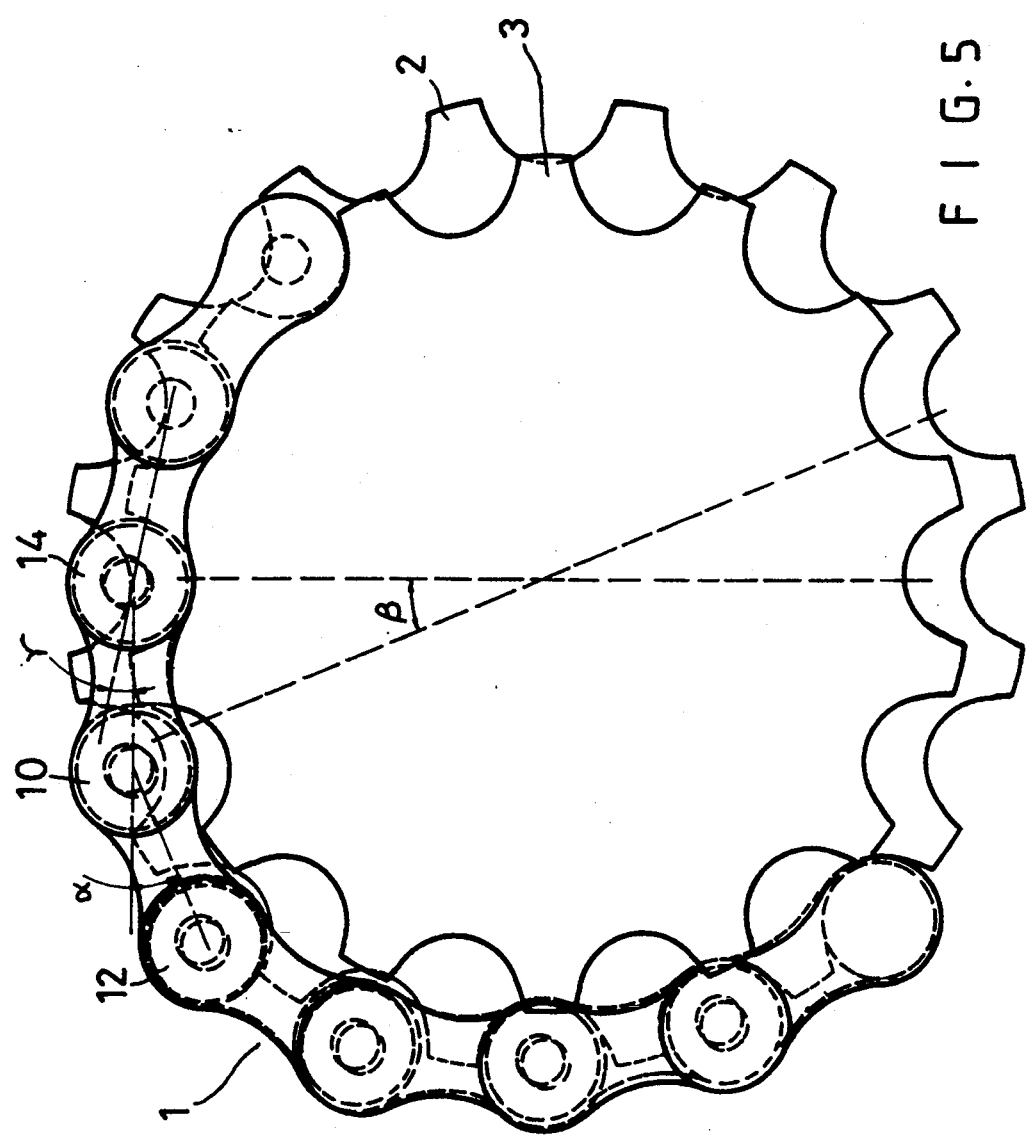
FIG. 5 is a perspective view of the present invention, showing the articular angle $\alpha$ at the pivot roller, the relative phase angle $\beta$, and the contained angle $\gamma$ at the escape roller.

Further, the escape roller 14 is mounted at the space between two consecutive teeth of the smaller sprocket wheel 3, while the engaging roller 12 is mounted at the space between two consecutive teeth of the larger sprocket wheel 2, the number of chain links between the escape roller 14 and the engaging roller 12 of the present invention is selected in accordance with the tooth number difference and the size difference between the larger and the smaller sprocket wheels so as to assure the smooth gear shifting; two trimming methods are presented to improve the efficiency of gear shifting; in the first trimming method, since the positions of the escape roller 14 and engaging roller 12 are known, we can adjust the relative phase angle $\beta$ between the larger and the smaller sprocket wheels and the position of the pivot roller 10 by considering the force balance condition and the requirement to minimize the trimming extents; the trimming extents are minimized by sharing the trimming portion to both the smaller sprocket wheel 3 and the larger sprocket wheel 2; the positions of the pivot roller 10 and the relative phase angle $\beta$ between the larger sprocket wheel 2 and the smaller sprocket wheel 3 can be found by an optimization computer software; the tooth shapes of the first kind shifting portion can be trimmed according to the result of the aforesaid calculation; in the second trimming method, the positions of the escape roller 14 and the engaging roller 12 and the relative phase angle $\beta$ between the smaller and the larger sprocket wheels are known; by adjusting the position of the pivot roller 10 and the articular angle $\alpha$ of the chain at the pivot roller so as to have the chain maintained in a balanced tension condition; the pivot roller should be located within a contained angle $\gamma$ 360°/N as shown in FIG. 5, in which "N" stands for the number of teeth of the smaller sprocket wheel, so as to prevent the roller next to the escape roller from contacting with the smaller sprocket wheel; the link plates connected to the pivot roller 10, the engaging roller 12 and the escape roller 14 are therefore designated so as to determine the trimming extent on the side surfaces of teeth according to the aforesaid trimming methods. The teeth whose shapes are trimmed in accordance with the present invention methods can precisely engage with the engaging roller even under full load and obtain a promptly and smoothly shifting operation.

Further, the present invention can be also be applied to improve the shifting performance when using a chain with inferior characteristics, such as the chain with too small or large lateral bending angle or the poor outer link plates. The second trimming method can be applied to minimize the trimming extent of the teeth so as to obtain a compromise between the shifting performance and the tooth strength.

In order to assure the designed shifting motion, a suitable trimming on the contact portion between the larger sprocket wheel and the corresponding pin and outer link plate of the pivot roller should be made so as to provide a positioning function thereat. In the trimming operation for the sprocket wheel, the chain is deemed as a cutting tool to cut off the obstructive portions on the teeth of the larger and the smaller sprocket wheels, which are considered resistant to the movement of the chain, likewise, the teeth in the moving path of a chain shifting from the smaller sprocket wheel to the larger sprocket wheel should be trimmed to facilitate the chain to engage promptly and smoothly in accordance with the designed shifting motion.

Figure 1:
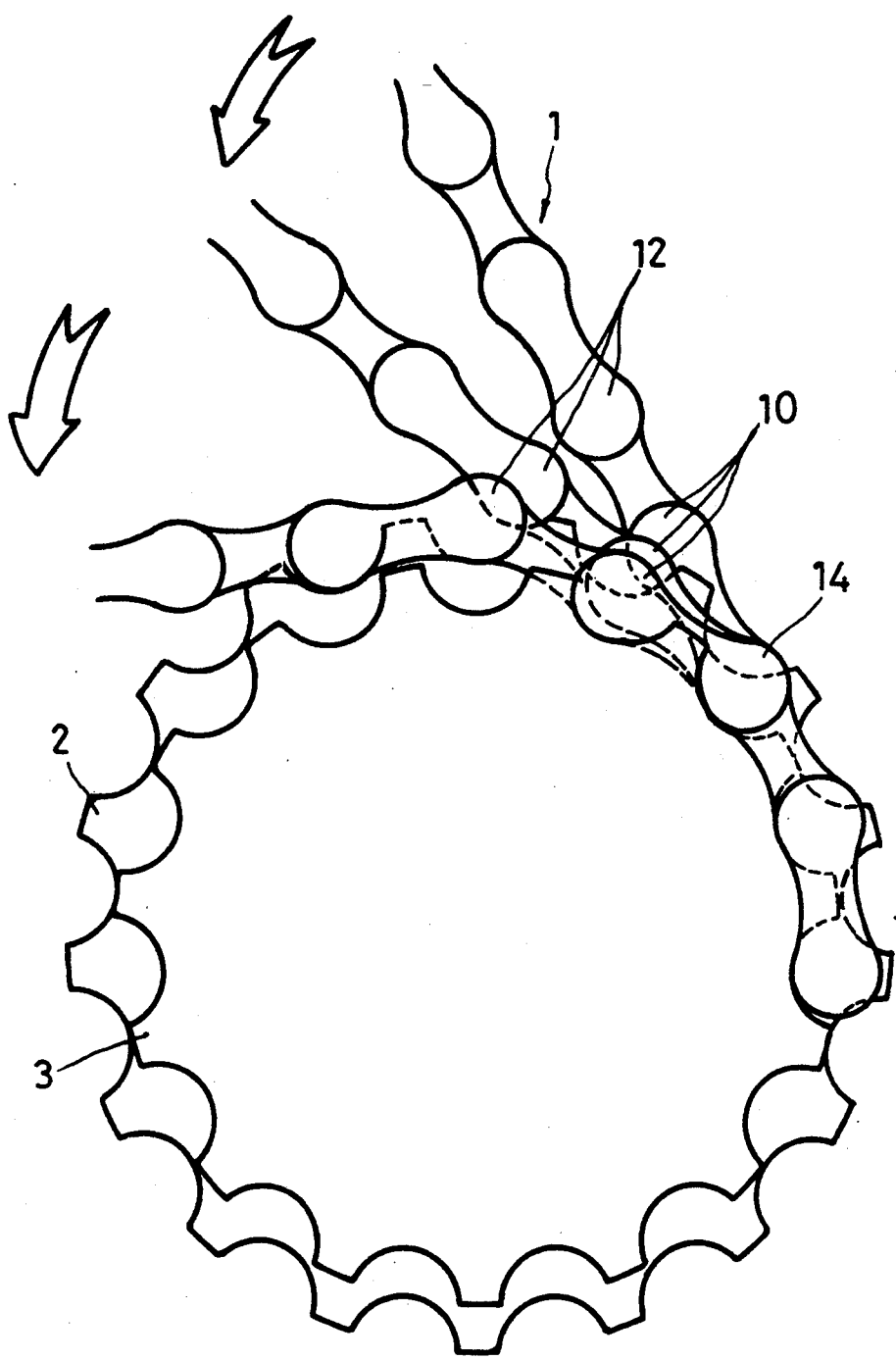
FIG. 1 illustrates the shifting movement of an embodiment according to the present invention.

Referring to FIG. 1, the embodiment according to the present invention comprises at least one larger sprocket wheel 2 and one smaller sprocket wheel 3. The peripheral edge of each of the sprocket wheels 2 and 3 is provided with a plurality of teeth, but the larger sprocket wheel 2 has more teeth than that of the smaller sprocket wheel 3. The guide pulley of rear derailleur is engaged with the left of the chain 1, and may guide the chain to move laterally with respect to the sprockets so as to perform the gear shifting process. When the chain 1 is shifted from the smaller sprocket wheel 3 to the larger sprocket wheel 2, the two wheels 2 and 3 rotate around the common shaft, the links of the chain 1 will engage regularly with the smaller and the larger sprocket wheels 3 and 2. For convenience of explanation, the gear shifting operation is shown in an inversion point of view as FIG. 1; the chain is winding around the center of the sprocket wheels and moving laterally while the wheels are fixed so as to perform the gear shifting from the smaller sprocket wheel 3 to the larger sprocket wheel 2.

Figure 2:
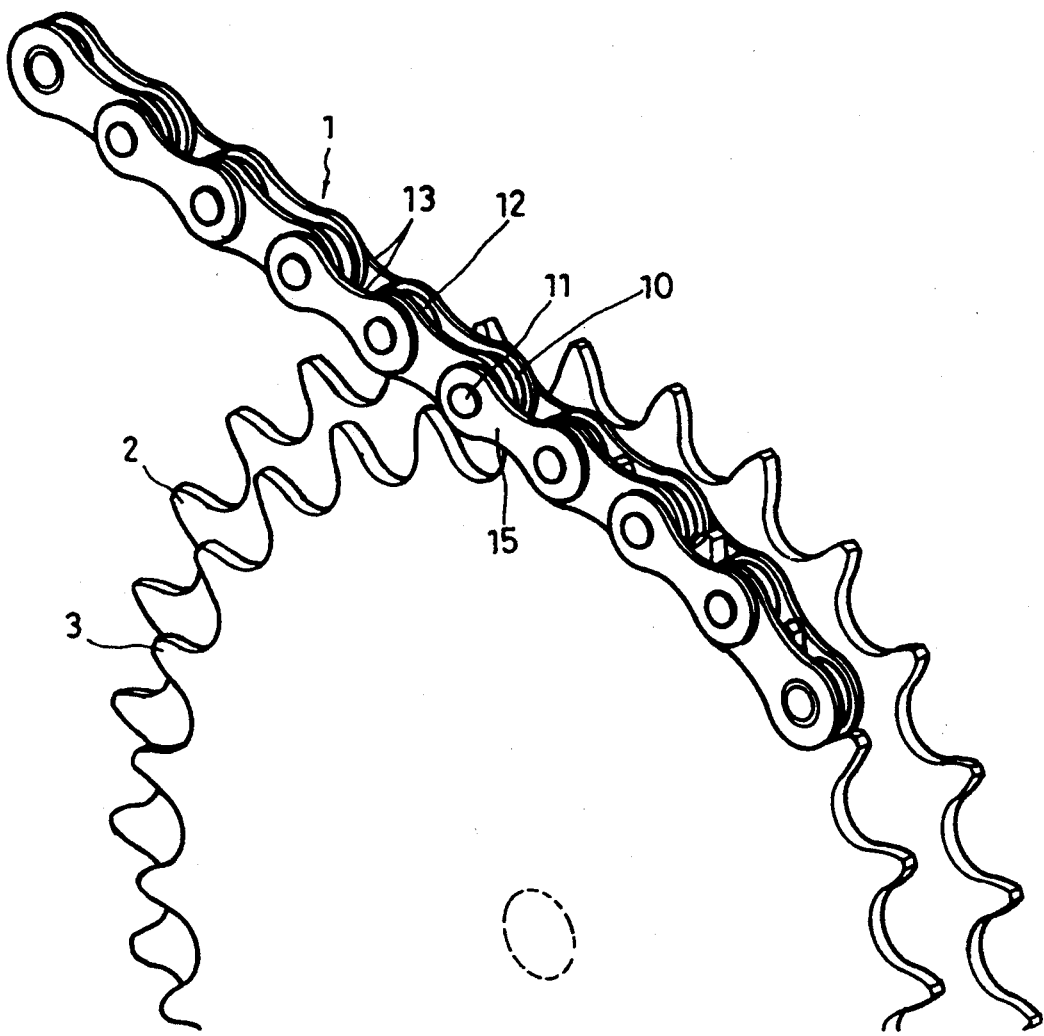
FIG. 2 is a perspective view of the present invention, showing the positions of the rollers and the chain links at the starting of the gear shifting process.

As soon as a gear shifting being started, the guide pulley of rear derailleur will move from a plane of the smaller sprocket wheel 3 to that of the larger sprocket wheel 2; in that case, the chain portion between the guide pulley and the smaller sprocket wheel 3 will be pulled laterally (as shown in FIG. 2) till the pin or the outer ink plate of a roller touching the side surface of the larger sprocket wheel 2, and such roller is referred as the pivot roller 10; the position of pivot roller 10 will be constrained if the side surfaces of sprockets 2 and 3 are trimmed according to the present invention, the portion of the chain downward from the pivot roller 10 will be driven laterally by the rear derailleur and the winding rotation about the pivot roller pin 11 so as to fulfil the engagement with the larger sprocket wheel 2. As described in the aforesaid shifting motion, the chain roller and the link plate that first engaged with the larger sprocket wheel 2 are referred to as the engaging roller 12 and the engaging link 13, the tooth being engaged is referred to as the engaging tooth 20 as shown in FIG. 3, in which the chain 1 has been shifted to engage with the larger sprocket wheel 2.

Referring to the FIG. 5, in order to have the chain shifting from the smaller sprocket wheel 3 to the larger sprocket wheel 2 smoothly, the relative phase angle $\beta$ between the larger and the smaller sprocket wheels 2 and 3 has to be designed appropriately. The relative phase angle $\beta$ are determined according to the aforesaid first trimming method as follows: while the guide pulley of rear derailleur guiding the chain 1 to the plane of the larger sprocket wheel 2 from the plane of the smaller sprocket wheel 3, an engaging roller 12 is the roller positioned near the peripheral of the larger sprocket wheel at the moment that the chain 1 first contact the side surface of the larger sprocket wheel 2; an escape roller 14 is the last roller that engaged with the smaller sprocket 3; an pivot roller 10 is the first roller that contact with the side surface of the larger sprocket wheel 2. Then, the geometrical relations between the aforesaid rollers and links are adjusted depending upon the engaging positions thereof on the larger and the smaller sprocket wheels 2 and 3 with different sizes. The relative phase angle $\beta$ of the larger and the smaller sprocket wheels 2 and 3 can be found by considering the engagement between the engage roller 12 and the larger sprocket wheels 2 and then to adjust the position of the pivot roller 10 so as to minimize the trimming extents while keeping the chain in a tension condition.

The relative phase angle $\beta$ are fixed after the first kind of the shifting teeth are established according to the aforesaid first trimming method. For the other possible shifting positions, the teeth shape should be trimmed according to the second trimming method: first assign the positions of the escape roller 14 and the relative phase angle $\beta$ then adjust the positions of the pivot roller 10 and the engaging roller 12 so as to minimize the trimming extents on the teeth while the chain is kept in the tension condition; the contained angle $\gamma$ drawn from the escape roller 14 to the pivot roller 10 should be in the range of $360°/N$, where N stands for the teeth number of the smaller sprocket wheel 3; the engaging roller 12 should contact with the working profile 21 of the tooth of larger sprocket wheel 2; if the aforesaid conditions are not satisfied, the teeth is not suitable to working as a shift teeth then next possible shifting teeth should be examined according to the aforesaid second trimming method.

Figure 4:
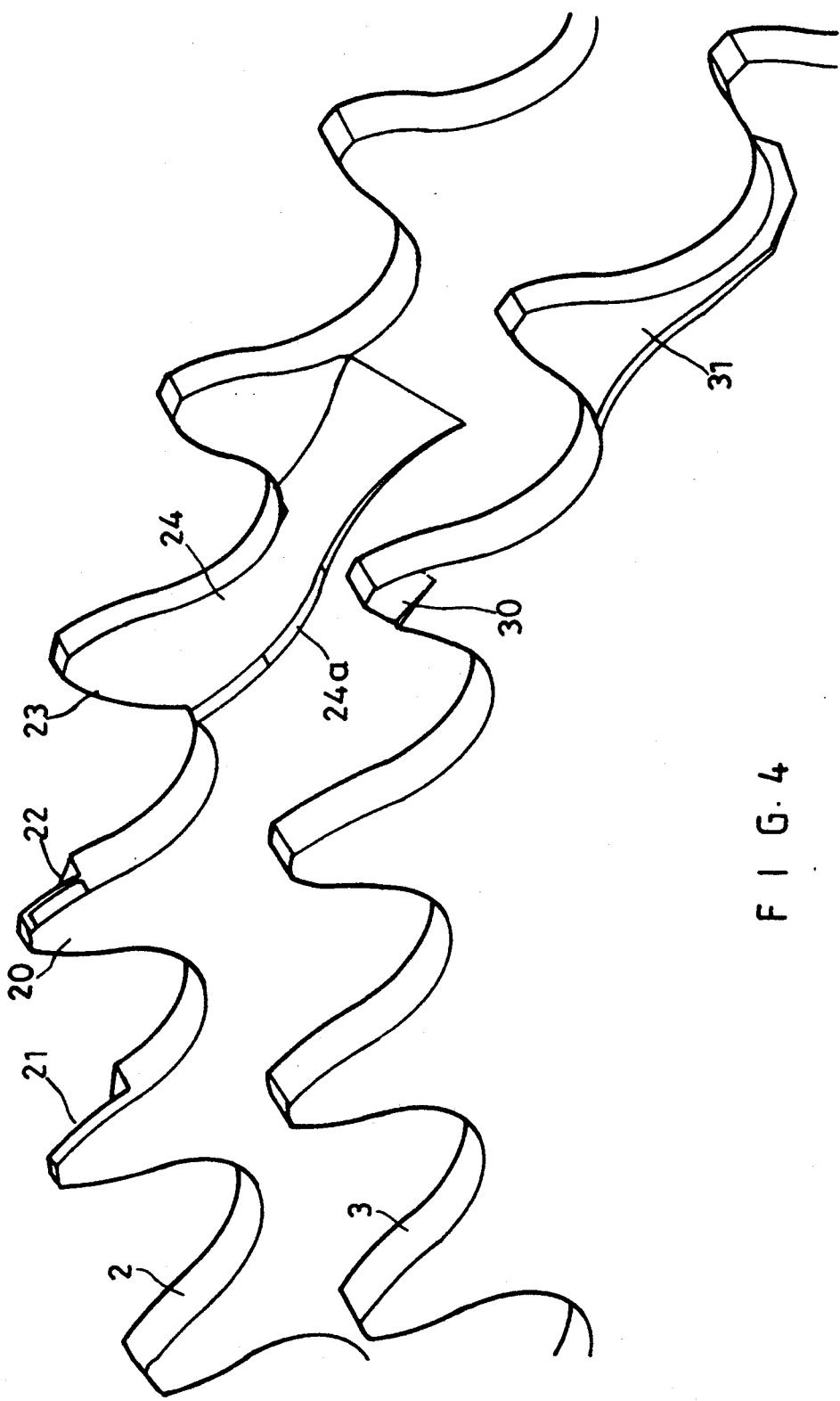
FIG. 4 is a perspective view of the present invention, showing the various cut-off parts on the engaging teeth section of the larger and smaller sprocket wheels.

In order to have the engaging roller 12 of the chain 1 surely being engaged with the engaging tooth 20 of the larger sprocket wheel 2, the side surfaces of teeth of the larger and the smaller sprocket wheels 2 and 3 adjacent to the aforesaid rollers have to be trimmed as shown in FIG. 4, particularly, a pivot-supporting area on the contact portion between the pivot roller pin 11 or the outer link plate thereof and the larger sprocket wheel 2 should be provide so as to have the pivot roller 10 surely engaging in accordance with the previous design; to trim the sprocket wheel as mentioned above, the chain 1 is deemed as a cutting tool and cuts off the obstructive portion on the moving path of the chain 1. As shown in FIG. 4, the cut-off portions include the cut-off parts 21, 22, 23, 24, 30 and 31; the cut-off part 24 is particularly for the pivot roller 10, while the cut-off part 31 is particularly for the escape roller 14.

In the aforesaid cut-off parts, the cut-off part 24 is referred to as a pivot-roller 10 supporting area such that the pivot roller 10 can be placed at the predetermined position so as to perform the correct pivot function. The depth ratio between the cut-off parts 24 and 31 can be adjust so as to minimize the cutting extents on the tooth while keeping the smooth gear shifting. The cut-off parts 21, 22 and 30 are cut off so as to assure the shifting performance even the chain is under full load; the size of cut-off parts 21, 22 and 30 are not such important, they may be modified in accordance with the manufacturing requirements therefore. A typical tooth trimmed area may include two consecutive teeth on the smaller sprocket wheel 3 from about the pivot roller 10 and three consecutive teeth on the larger sprocket wheel 2 from the escape roller 14. The height of the pivot-roller supporting area 24a must be precisely controlled so as to guarantee the shifting performance.

By means of the aforesaid first trimming method, the relative phase angle $\beta$ between the larger and the smaller sprocket wheels and the teeth shape of the first kind are determined. The teeth shapes of the other possible shifting teeth are then designed followed by the second trimming method. It is not only to improve the gear shifting efficiency, but to minimize the shifting time and the noise during shifting; then, the comfort and pleasure in riding a bicycle are elevated.

The aforesaid embodiment is designed for a multi-stage sprocket assembly, with which a chain is guiding by a derailleur to perform gear-shifting. If the present invention is applied on a rear free-wheel assembly for the shifting operation of a chain, the chain guide will be referred to as a rear speed changer; if the present invention is applied on a front chain wheel assembly, the derailleur will be referred to a front derailleur, which the chain-guide plates of the front derailleur thereof will guide the chain to shift.

We claim:

1. A multiple sprocket assembly for use in a bicycle comprising:

at least a large sprocket wheel and a small sprocket wheel, each of said large and small sprocket wheels having a plurality of teeth on an outer edge thereof, and said large sprocket wheel having more teeth than said small sprocket wheel;

each of said sprocket wheels being adapted to engage with a chain guided by a derailleur; said chain comprising a plurality of rollers connected in series by link plates;

said multiple sprocket assembly being characterized in that said small sprocket wheel having at least two consecutive teeth each with a portion of its side surface being trimmed off, and said large sprocket wheel having at least three consecutive teeth each with a portion of its side surface being trimmed off in accordance with a predetermined phase angle between said large and small sprocket wheels, so as to avoid an interference between said link plates and said large sprocket when said chain is being shifted from said smaller sprocket to said larger sprocket.

2. A multiple sprocket assembly according to claim 1 wherein:

said teeth of said small sprocket having first proximal and first distal side surfaces with respect to said large sprocket, and said teeth of said large sprocket having second proximal and second distal side surfaces with respect to said small sprocket, said side surfaces being defined such that said first and second proximal side surfaces are facing each other; and at least two of said trimmed portions on said small sprocket being formed on said first distal side surface, and said trimmed portions on said large sprocket containing at least two trimmed portions on said second distal side surface and at least one trimmed portion on said second proximal side surface.

3. A multiple sprocket assembly according to claim 1 wherein said side surfaces of said teeth of said small sprocket are trimmed in such a manner such that an escape roller, which is defined as a roller of said chain to be first disengaged from said small sprocket when said derailleur begins acting on said chain during a gear shifting operation, will not be immediately lifted up, but will be pushed laterally as a result of said trimmed portions of said small sprocket.

4. A multiple sprocket assembly according to claim 1 wherein said side surfaces of said teeth of said large sprocket are trimmed in such a manner such that one of said surfaces contains an axially extending portion so as to serve as a fulcrum for an engage roller, which is defined as a roller of said chain to be first engaged with said large sprocket after said derailleur has acted on said chain during a gear shifting operation, to be pivotally engaged with said large sprocket.

* * * * *